United States Patent
Davies et al.

[11] Patent Number: 5,870,260
[45] Date of Patent: *Feb. 9, 1999

[54] MAGNETIC RECORDING SYSTEM HAVING A SATURABLE LAYER AND DETECTION USING MR ELEMENT

[75] Inventors: David H. Davies, Cupertino; Thomas M. Coughlin, Atascadero; Beverley R. Gooch, Sunnyvale, all of Calif.

[73] Assignee: Ampex Corporation, Redwood City, Calif.

[*] Notice: This patent issued on a continued prosecution application filed under 37 CFR 1.53(d), and is subject to the twenty year patent term provisions of 35 U.S.C. 154(a)(2).

[21] Appl. No.: 862,415

[22] Filed: May 23, 1997

Related U.S. Application Data

[63] Continuation of Ser. No. 575,203, Dec. 20, 1995, abandoned.

[51] Int. Cl.$^6$ .................................................. G11B 5/33
[52] U.S. Cl. ............................................. 360/113; 360/115
[58] Field of Search ................................. 360/113, 115, 360/119, 125, 126

[56] References Cited

U.S. PATENT DOCUMENTS

| | | | |
|---|---|---|---|
| 3,079,468 | 2/1963 | Morey | 360/119 |
| 3,084,227 | 4/1963 | Peters | 360/115 |
| 3,106,617 | 10/1963 | Fox | 360/119 |
| 3,127,592 | 3/1964 | DeNeergaard | 360/112 |
| 3,188,399 | 6/1965 | Eldridge | 360/126 |
| 3,239,823 | 3/1966 | Chang | 360/111 |
| 3,255,307 | 6/1966 | Schuller | 360/84 |
| 3,314,056 | 4/1967 | Lawrance | 360/119 |
| 3,391,254 | 7/1968 | Honig | 360/115 |
| 3,432,837 | 3/1969 | Fan | 360/119 |
| 3,435,440 | 3/1969 | Nallin | 360/115 |
| 3,555,204 | 1/1971 | Braun | 360/115 |
| 4,277,809 | 7/1981 | Fisher et al. | 360/131 |
| 4,318,136 | 3/1982 | Jeffers | 360/17 |
| 4,410,603 | 10/1983 | Yamamori et al. | 428/611 |
| 4,464,691 | 8/1984 | Sawazuki et al. | 360/111 |
| 4,530,016 | 7/1985 | Sawazuki | 360/55 |
| 4,535,369 | 8/1985 | Sawazuki | 360/55 |

(List continued on next page.)

FOREIGN PATENT DOCUMENTS

| | | |
|---|---|---|
| 71361/74 | 1/1976 | Australia . |
| 0 472 162 A1 | 2/1992 | European Pat. Off. . |
| 35 09 020 A1 | 9/1985 | Germany . |
| 56-65712 | 6/1978 | Japan . |
| 818811 | 8/1959 | United Kingdom . |
| 822240 | 10/1959 | United Kingdom . |
| 844081 | 8/1960 | United Kingdom . |
| 2 073 472 | 10/1981 | United Kingdom . |
| WO87/03728 | 6/1987 | WIPO . |
| WO 93/12928 | 7/1993 | WIPO . |

OTHER PUBLICATIONS

Camras, "Magnetic Recording Handbook", 1988, pp. 235–239.

Opfer, et al., "Thin–Film Memory Disk Development" 1266 Hewlett Packard Journal, 36, No. 11, Nov. 1985, pp. 4–10.

Koster, "Neue magnetische Informationstrager" Fernseh–Und Kino–Technik, Oct. 1984, 38, No. 10, pp. 432–432.

Kornei, "Survey of Flux–Responsive Magnetic Reproducing Heads", Journal of the Audio Engineering Society, vol. 2, No. 3, Jul. 1954.

(List continued on next page.)

*Primary Examiner*—Jefferson Evans
*Attorney, Agent, or Firm*—John G. Mesaros; George B. Almeida

[57] ABSTRACT

A magnetic storage system is disclosed that includes a magnetic storage layer associated with a soft magnetic saturable keeper layer. A transducer is spaced from the storage layer and the keeper layer in flying relationship thereto, with an MR element contained therein to provide high sensitivity detection along with the reduced spacing loss available from the keepered storage layer.

9 Claims, 3 Drawing Sheets

U.S. PATENT DOCUMENTS

| | | | |
|---|---|---|---|
| 4,613,915 | 9/1986 | Crouse et al. | 360/77.02 |
| 4,642,709 | 2/1987 | Vinal | 360/77.05 |
| 4,657,812 | 4/1987 | Hatatani et al. | 428/328 |
| 4,657,819 | 4/1987 | Funaki | 428/458 |
| 4,687,712 | 8/1987 | Sugita et al. | 428/611 |
| 4,698,711 | 10/1987 | Vinal | 360/113 |
| 4,717,592 | 1/1988 | Nagao et al. | 427/128 |
| 4,782,415 | 11/1988 | Vinal | 360/113 |
| 4,985,795 | 1/1991 | Gooch | 360/115 |
| 5,041,922 | 8/1991 | Wood et al. | 360/55 |
| 5,062,007 | 10/1991 | Nakatsu et al. | 360/29 |
| 5,105,323 | 4/1992 | Ruigrok | 360/122 |
| 5,119,255 | 6/1992 | Gooch | 360/115 |
| 5,153,796 | 10/1992 | Gooch | 360/115 |
| 5,189,572 | 2/1993 | Gooch | 360/115 |
| 5,227,939 | 7/1993 | Gooch | 360/115 |
| 5,331,492 | 7/1994 | Komai et al. | 360/113 |
| 5,337,203 | 8/1994 | Kitada et al. | 360/113 |
| 5,483,403 | 1/1996 | Voegeli | 360/113 |
| 5,493,464 | 2/1996 | Koshikawa | 360/113 |
| 5,514,452 | 5/1996 | Araki et al. | 360/113 |

OTHER PUBLICATIONS

Stewart, "Magnetic Recording Techniques", 1958, pp. 87–95.

Flora, et al., "Multi–Track Probe Type Recording Transducer", IBM Technical Bulletin, vol. 3, No. 11, Apr. 1961.

Iwasaki, "Perpendicular Magnetic Recording", IEEE Transactions on Magnetics, vol. MAG–16, No. 1, 1980.

Quak, "Influence on the Layer of Thickness of a Double–Layer Medium on the Reproduced Signal in Perpendicular Recording", IEEE Transactions on Magnetics, vol. MAG–19, No. 4, Jul. 1983, pp. 1502–1505.

Iwasaki, et al., "Perpendicular Recording/Playback on Composite Film Media", Third Annual Magnetics Conference, 1979, No. 37.

Iwasaki, et al., "Anisotropy and Film Structure of Perpendicular Recording Medium", Third Annual Magnetics Conference, 1979, No. 38.

Iwasaki, et al., "Magnetics Behaviors of Composite Film Medium in Perpendicular Recording", Third Annual Magnetics Conference, 1979, No. 39.

Iwasaki, et al., "High Density Recording and Reproducing with Perpendicular Magnetic Head", Third Annual Magnetics Conference, 1979, No. 40.

Iwasaki, et al., "Experiments of Perpendicular Magnetic Recording with Magnified Head and Medium", Third Annual Magnetics Conference, 1979, No. 41.

Iwasaki, et al., "One Method for Magnetic Recording Using Composite Recording Medium", Third Annual Magnetics Conference, 1979, No. 46.

Iwasaki, et al., "Relationship between Recording Sensitivity and Reproducing Sensitivity in Perpendicular Recording", Third Annual Magnetics Conference, 1979, No. 48.

MAGNETIC RECORDING SYSTEM HAVING A SATURABLE LAYER AND DETECTION USING MR ELEMENT

The application is a continuation of Ser. No. 08/575,203 filed Dec. 20, 1995, now abandoned.

BACKGROUND OF THE INVENTION

1. Field of the Invention

The present invention relates to an improved magnetic recording system having a magnetic storage layer and an associated saturable, high permeability magnetic layer, both of which are arranged in cooperative relationship with relatively movable head detection means. More particularly, the invention concerns such a system where the high permeability, saturable layer provides significantly reduced reproduce spacing loss at low head flying heights, and an improved overall sensitivity permitting increased linear or areal recording density through the use of an MR detection element within the head.

2. Description of the Related Art

Wideband, high density magnetic storage systems with flying heads are well known in the prior art. Such systems include a storage layer of hard magnetic material capable of efficiently storing magnetic flux written into and reproduced from the layer in high density configuration by a flying head of high sensitivity, such as a ferrite head, a thin film inductive head, or an MR head. In such systems, one of the major factors in achieving ever higher recording densities is the capability of eliminating or minimizing the effect of various losses that occur during the transducing operations within such systems.

One of the more significant transducing losses, usually called "spacing loss", results from the physical dimension or spacing that must occur between the magnetic storage medium and the head. It is well recognized that the effect of spacing loss is more significant during the reproduce stage of storage operations. In addition to spacing loss, signal quality is affected by poor efficiency in signal transfer, as for example, that caused by reproduce gap loss. Reproduce gap loss is generally characterized as the loss in efficiency that results from the finite length of the physical gap associated with the head during transfer operations, and is of particularly noticeable impact at shorter wavelengths.

Many attempts to reduce spacing loss and reproduce loss directly, for example by reducing flying height, have met with only partial success. Collision damage, excessive transducer wear and storage medium wear still exist as limiting factors in determining transducer flying height, with substantial transducing losses still remaining in such systems.

U.S. Pat. Nos. 4,717,592 and 4,657,819 describe two film vertical recording media incorporating a layer of soft magnetic material, to suppress thermal degradation in the one case, and to reduce magnetic anisotropy-induced signal fluctuations, in the other case.

U.S. Pat. No. 5,041,922 and a related technical paper entitled "A High Resolution Flying Magnetic Disk Recording System with Zero Reproduce Spacing Loss", presented at the June 1991 IEEE Intermag Conference, describe a technique for reducing spacing and reproduce gap losses by deposition of a soft magnetic layer upon the magnetic storage layer of a storage system. The '922 patent is assigned to the same assignee as is the present application.

In an unsaturated state, the soft magnetic layer acts as a shunt path that prevents signal flux from reaching the head. However, when a saturating bias signal is applied selectively to such a soft magnetic layer, the permeability of the saturated region is lowered to the extent that signal flux from bits of information stored in the storage layer readily permeates the saturated region. At the same time, the reluctance between the head poles and the unsaturated regions of the soft layer remains relatively low. Thus, the permeability of the saturated region is near that of air, while the adjacent unsaturated zones retain high permeability.

In effect, this results in formation of a "virtual" gap in the "keeper" layer. With the virtual gap, the signal flux from the storage layer is no longer shunted by the keeper. Instead, signal flux is directed to the pole pieces of the head through the unsaturated regions of the keeper on either side of the virtual gap. Since the unsaturated regions of the keeper are in direct contact with the storage layer, the impact of physical spacing between the virtual head structure and the storage layer is greatly reduced, if not effectively eliminated.

At that time, the sections of the keeper on either side of the virtual gap can be characterized as extensions of the core structure of the system. Thus, the addition of a keeper layer in the system might be characterized as adding a "pseudo" layer of magnetic material to the head when saturation occurs. This, in turn, results in the effective elimination of spacing losses since the head spacing, although not physically changed, can be considered as an air gap that in an "equivalent" magnetic head structure increases the reluctance of the head magnetic circuit and thereby causes a small loss in head efficiency, but does not contribute the large frequency sensitive spacing loss that previously existed. The reproduce gap losses of the system are reduced, as well, through reduction in the effective length of the physical gap of the head.

A publication titled "Magnetic Recording Media Employing Soft Magnetic Material" was published Jul. 8, 1993 under International Publication No. WO 93/12928, from International Application No. PCT/U.S. 92/10485 dated Dec. 7, 1992, assigned to Connor Peripherals, Inc. The Connor application discloses and claims an improvement in a system such as that described in the '922 patent through use of a non-magnetic layer located between the storage layer of the system and the keeper layer.

The purpose of the non-magnetic layer in the Connor application is to interrupt magnetic exchange coupling between the recording layer and the soft magnetic layer of the system. It is believed the use of a layer such as that proposed by the Connor application clearly falls within the purview of the '922 patent. For example, see lines 7–10 of column 7 of the patent wherein it is disclosed that durable overcoats, or conducting coats, may be used in conjunction with the recording layer.

Indeed, such an isolation layer might well occur inherently in such a structure due to oxidation of the magnetic layers such as might occur between processing stages, during fabrication of the layered system. Moreover, one of the co-inventors of the present application is also a co-inventor with respect to the '922 patent. Since issuance of the '922 patent he has conducted additional investigation to evaluate possible benefit of using a separation layer in a structure such as that disclosed in the '922 patent. That investigation was not conclusive. However, it must be noted that the use of break layers for the purpose of reducing molecular and atomic migration across active layer boundaries is acknowledged to be a well recognized technique in the prior art, long prior to the filing date of the '922 patent.

A U.S. Patent Application titled Two-Gap Magnetic Read/ Write Head, assigned to the same assignee as is the present application, by Beverley R. Gooch and George Varian was filed on the same day as the present application, disclosing an improved magnetic storage system including a saturable keeper layer associated with the magnetic recording layer and further including an improved two-gap inductive head which eliminates the need for separate read and write heads within the system.

While inductive heads used in connection with keepered disk technology are believed to represent useful gains in recording technology, and particularly in increased recording density, certain limitations exist that impede their use for the achievement of very high recording density, as measured by current standards. Since the output voltage of inductive heads is a function of disk velocity and the number of turns on the head, as recording densities increase, the operating frequency also increases, and hence noise increases. Because of resonant effects and head noise factors, the number of turns that can be placed upon a head is limited. This, in turn, limits the signal to noise performance that can be attained from an inductive head such as a ferrite head, and that factor eventually limits the potential recording density.

SUMMARY OF THE INVENTION

Consequently, while the improvements outlined in the patents and applications discussed herein represent a significant improvement to the state of storage technology, it should be apparent that further improvements are needed in connection with magnetic storage technology in order to meet ever increasing industry and consumer demand for storage of information.

Accordingly, it is a feature of the invention to provide an improved storage system, utilizing a storage layer of hard, high coercivity magnetor material and a layer of soft, high permeability magnetic material associated therewith as a keeper layer in conjunction with a high sensitivity detection arrangement utilizing a magnetoresistive or MR element.

It is a further feature of the invention to use an MR element with a high permeability, saturable keeper in a magnetic storage system wherein the MR element is arranged in a unique way to take full advantage of the decreased spacing loss within the system that results from the keeper, and utilizes the increased sensitivity of the MR element in a fashion that reduces adjacent transition interference, improves linear density resolution and track density and avoids limitations heretofore attendant in the use of inductive heads.

It is yet a further feaature of the invention to provide such a system wherein the MR element can be positioned within the magnetic circuit of the transducer in a fashion that permits it to be of a simplified and less expensive MR design.

These and other features and advantages of the invention will become apparent from the following detailed description and accompanying drawings wherein preferred embodiments of the invention are described. The described embodiments generally comprise a magnetic storage system, which can include a rotatable disk having a support structure upon which a hard, high coercivity magnetic storage layer is contained, with the storage layer having a soft magnetic keeper layer associated therewith. A transducer is spaced from the disk in flying relationship thereto in conventional fashion, with a head gap arranged to follow storage tracks in the disk with predetermined head spacing. Means are provided to selectively bias the keeper layer, and an MR element of substantial dimension is provided at a selected location within the magnetic circuit of the head core. In one embodiment the location of the sensing element is somewhat removed from the gap to provide high sensitivity detection, with enhanced stability in terms of electostatic shock, thermal affects and corrosion.

BRIEF DESCRIPTION OF THE DRAWINGS

Numerous advantages resulting from the aforementioned design will be explained in more detail in conjunction with the accompanying drawings, in which.

DETAILED DESCRIPTION OF AN ILLUSTRATIVE EMBODIMENT

Figure 1:
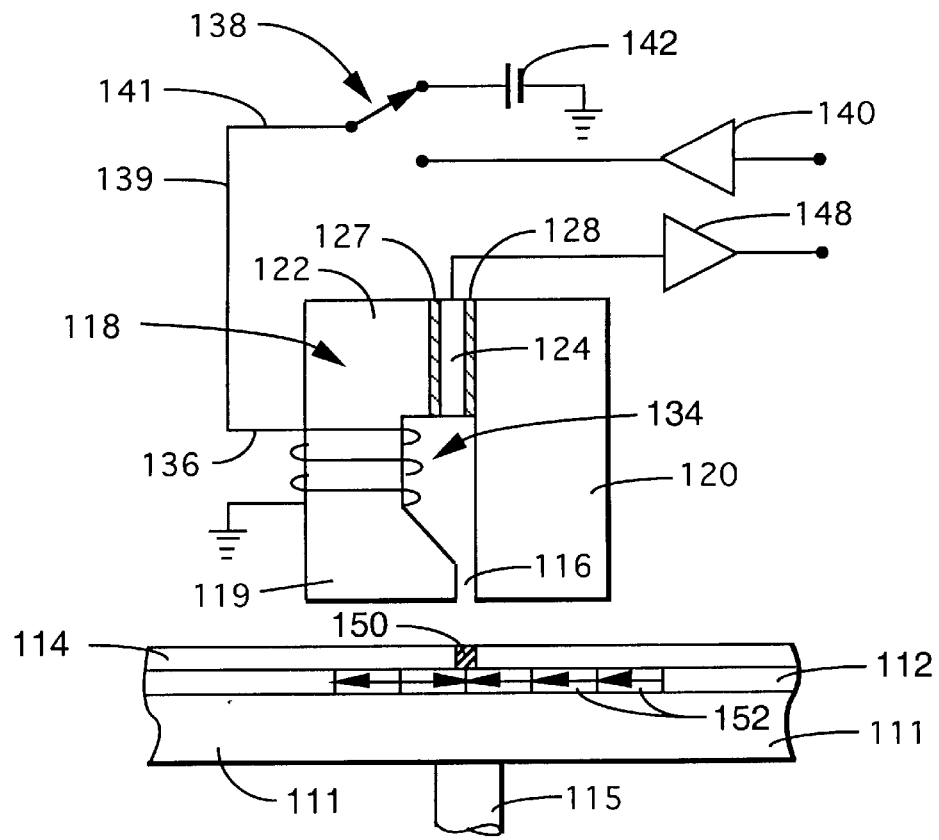
FIG. 1 is a schematic view of a system designed in accordance with the invention that includes a hard magnetic storage layer and a saturable keeper layer arranged to cooperate with a detector that embodies an improved MR element.

Referring now to the drawings, a preferred embodiment of the invention will be described. A magnetic storage system is schematically represented in FIG. 1, including a substrate 111 upon which is supported a magnetic storage layer 112 that is associated with an overlying keeper layer 114. The substrate can be a disk of a typical disk storage unit, if desired, in which case the disk can be rotated by means such as shaft 115, and thereby moved with respect to a head gap 116 of a head generally indicated by numeral 118. Alternatively, the substrate could comprise a tape or other magnetic medium useful for storage.

The substrate is preferably fabricated of a nonmagnetic material such as aluminum, plastic, or glass. The magnetic storage layer is a high coercivity, hard magnetic material that is capable of efficient storage of magnetic flux for example a cobalt chromium, tantalum alloy. Depending upon whether a disk or a tape environment is contemplated the storage layer material can take the form of magnetic material dispersed within a binder, or a film of high coercivity magnetic material or metal alloy. The method of fabrication of both tape and disk substrates having magnetic storage layers contained thereon is well known in the art and is not further described herein, except to note that deposition by sputtering is the most common form of fabrication of such storage layers in connection with disks.

The keeper layer is soft magnetic material having low coercivity and high permeability and being capable of saturation by relatively low bias signals. Ni—Fe alloy (Permalloy), Fe—Al—Si—Ni alloy (Super Sendust), or an Fe—Al—Si alloy (Alfesil or Sendust) would be suitable keeper materials. Again, the keeper layer can be deposited by any suitable process, although sputtering is the most commonly used process in the prior art. The dimensions of the layers illustrated can be determined by one of ordinary skill in the art depending upon the recording density, flying height of the head, and other recording factors involved, and based upon the teachings of the aforementioned patents and applications common to the assignee of record. If desired, a break layer, not illustrated, could be applied between the storage layer and the keeper layer, as is well known to those skilled in the art.

Figure 2:
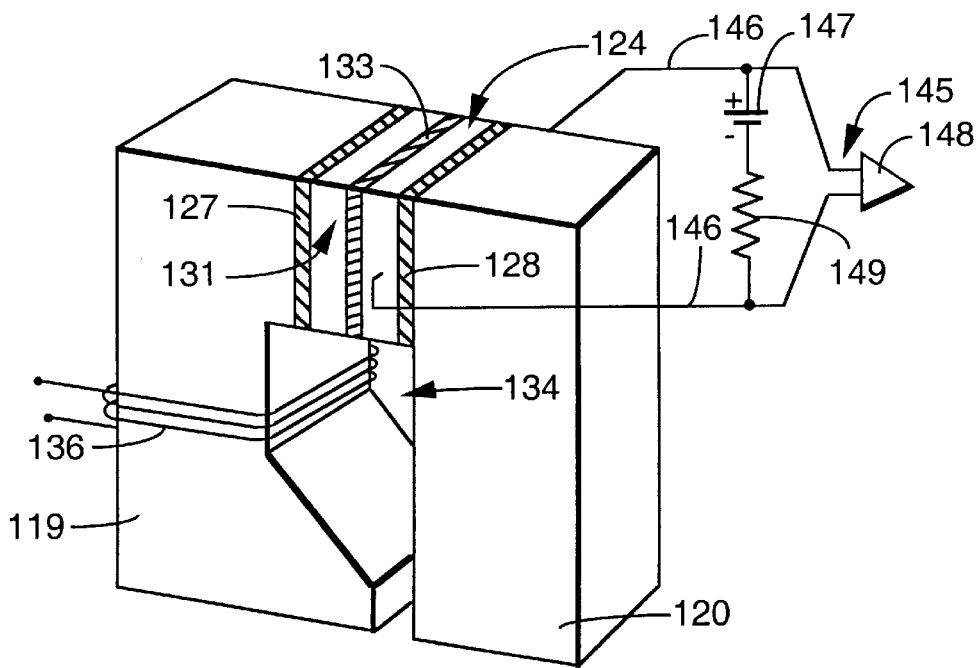
FIG. 2 is an enlarged view of a portion of the magnetic core of the head illustrated in FIG. 1.

Magnetic head 118 is comprised of a two poles 119,120, respectively, disposed in spaced relationship between a supporting bridge 122 to form gap 116. These major portions of the core of the magnetic head are preferably fabricated of ferrite. In the embodiment illustrated, the bridge further includes a magnetoresistive (MR) sensing element 124 generally sandwiched between nonmagnetic, isolation spacers 127,128, as best seen in FIG. 2. The spacers can be glass or aluminum, for example. In addition, a soft magnetic adjacent layer 131 (SAL) is provided on one side of the sensing element, inside the spacers, for a biasing purpose explained in more detail hereinafter. Layer 131 is separated from the MR element by a nonmagnetic isolation spacer 133. All these layers can be assembled by conventional processing steps that are well known.

The head can be constructed from ferrite using a metal in gap type structure, or can be constructed using thin film techniques, if desired. To maximize head efficiency a small winding window 134 is provided in the head, and a short magnetic path is used.

A coil 136 is provided through the winding window in the embodiment illustrated. It should be recognized that if thin film techniques are used to fabricate the head, a thin film coil can be fabricated along with the head. In a ferrite version, a separate conductive wire of appropriate dimension is utilized. In either instance, coil 136 is adapted to be connected to a write-record circuit generally indicated by numeral 138 (see FIG. 1) by a conductor 139. With the system operating in the record mode, the coil is connected through a switch 141 to a record amplifier 140, and the head functions like a conventional inductive head.

Thus, the recording signal generates a field that is sufficient to saturate a portion of the keeper layer in a region beneath the head gap. When the keeper is saturated by the record field, the permeability of the saturated region drops and the record flux passes through the unsaturated portions on either side of the saturated region to the storage layer beneath the keeper.

In the reproduce mode, coil 136 is connected via switch 141 to a bias input 142. A small DC, or AC, bias signal is then applied to the head coil to create a bias flux in the head gap sufficient to saturate the region 150 of the keeper layer directly beneath the head gap. This again reduces the permeability of the keeper and allows flux from bits 152 recorded in the storage layer to reach the head core. This signal flux is then guided to the MR sensor where the resistivity of the sensor changes as a result of the flux variation in well known fashion.

However, in addition to the keeper bias, the MR sensor requires an additional bias flux in the reproduce mode to linearize its output signal. In the embodiment illustrated, this bias is provided by soft adjacent layer 131 next to the MR element. The sense current in the MR element induces fields in the soft adjacent layer which are coupled back to the MR sensor. The flux from the induced fields then acts like a bias flux in the MR sensor element.

As shown in detail in FIG. 2, the MR sensor is selectively connected by a conductor 146 to a reproduce circuit 145 comprising a resistor 149 and the sense current source 147. Consequently, a small change in the resistivity of the MR sensor will result in a voltage change that is sufficient to identify the presence of a recorded bit in the storage layer. This voltage change is amplified by the reproduce preamplifier 148 whereby high sensitivity MR detection is attained.

The MR sensor, incorporated within a head core as illustrated herein provides a number of advantages in conjunction with keepered media storage systems. Since the output voltage of the MR sensor is a function only of recorded flux, larger output voltages can be obtained from it as compared to an inductive head. This results in the improved signal to noise characteristics that are necessary for higher recording density. The improved signal to noise characteristics of the MR sensor are particularly well suited for use with a system such as the keepered media system described herein that has greatly reduced spacing loss.

The MR sensor element described in the embodiment of FIG. 1 has been deliberately positioned at a location away from the storage layer or disk surface. This design offers several advantages. In particular, the sensor is protected from disk surface defects that can produce electro-static discharge and large thermal noise spikes leading to data errors and potential damage to the MR element.

Another advantage is the capability to optimize the MR sensor output independent of recording wavelength. In the current design, the resolution is determined by the gap in the head core, as in a conventional ring head.

Moreover, the sensitivity of an MR element is proportional to its thickness. Reducing the thickness results in reduction of the linear operating range. In the present embodiment the thickness of the MR sensor can be optimized to achieve a maximum linear range and its performance can be more nearly optimized independent of wave length requirements than a standard MR head, for example, that might be positioned in close proximity to the storage surface.

In the embodiment illustrated, the MR sensor is incorporated in the rear portion of the head core. This arrangement has certain advantages as are explained herein, but it should be recognized that the MR sensor could be placed at any location in the flux path of the head, subject to the factors explained herein. It should also be recognized that the embodiments illustrated herein comprise a single track head gap. However, it is well recognized by those skilled in the art that the fabrication techniques referred to herein could be used to fabricate multiple head structures, if desired.

Figure 3:
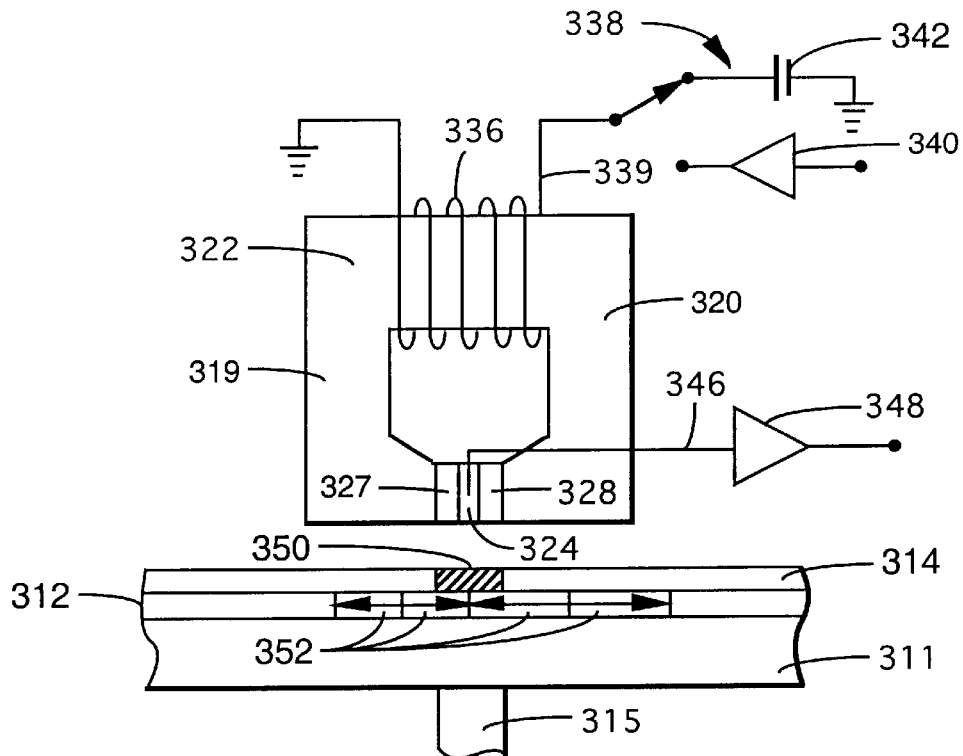
FIG. 3 is a schematic view of an alternative embodiment of the present invention.
Figure 4:
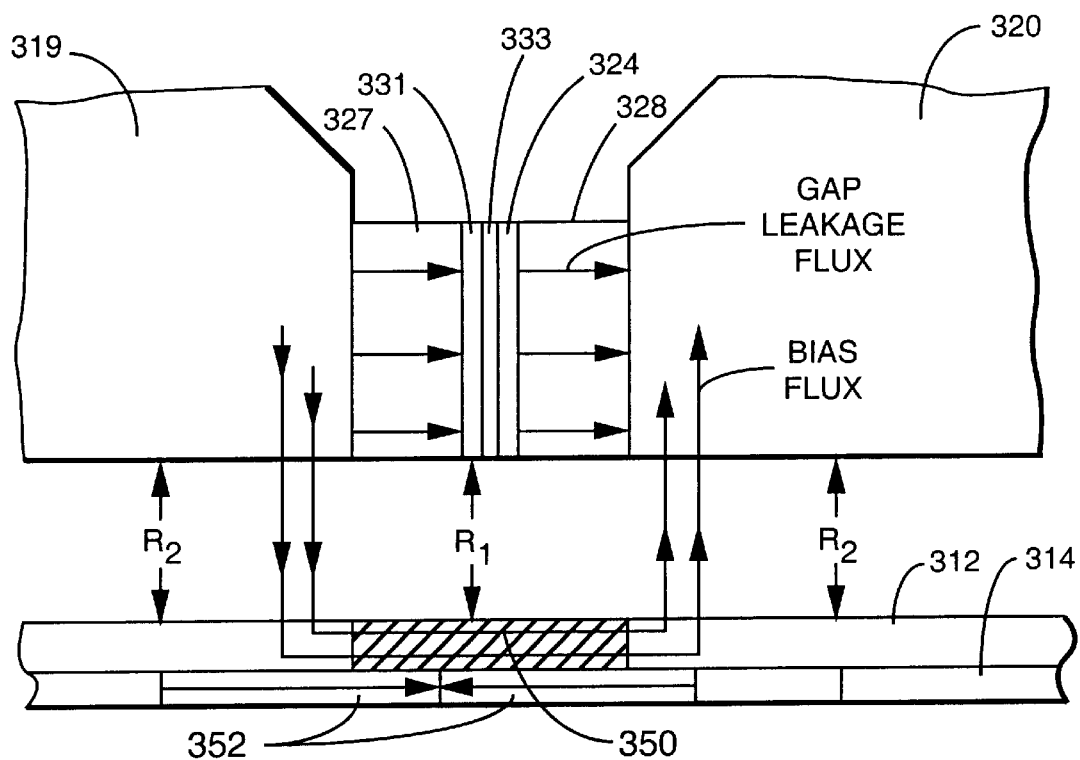
FIG. 4 is an enlarged view of a portion of the structure illustrated in FIG. 3.

Referring now to FIGS. 3 and 4, another embodiment of the invention is disclosed in which the sensing element is positioned in the gap instead of within the back magnetic circuit of the head core. FIG. 3 is a schematic view of a section of the head structure and keepered media disk storage system that is similar in most structural respects to the embodiment illustrated in FIG. 1. In FIG. 3, like elements of the system are identified by like numerals to those used in FIG. 1, except that corresponding 300 series numbers are used.

The embodiment of FIG. 3 uses a similar substrate and similar head structure using the same materials and fabrication techniques as are explained in connection with FIGS. 1 and 2. Likewise, the FIG. 3 system uses the same type of recording and reading system and therefore the same circuits are shown as are used in connection with FIGS. 1 and 2.

In particular, the MR element used in the FIG. 3 embodiment is of the same general configuration as that used in FIG. 1, with the exception that it is mounted in the head gap and is therefore much closer to the media. Thus, spacers 127, 128 of FIG. 1 appear as spacers 327,328 of FIG. 3. In the embodiment of FIG. 3, the head poles act as the MR sensor shield and also provide a means for recording and applying the bias field necessary to saturate the keeper layer to create a virtual gap in the keeper during reproduce operations.

As before, either a DC or AC bias current can be applied to the head coil. When the bias current is applied, the bias flux, as before, creates a saturated region in the keeper directly opposite the head gap, which reduces the permeability of that region. Consequently, the keeper no longer acts as a shunt to the storage layer, and signal flux from stored bits fringes into the MR sensor. Due to the change of resisitivity of the MR element, detection occurs in well known fashion.

As occurs with conventional MR designs, the head poles act to shield the MR sensor from flux from adjacent transitions of stored bits. The new system results in improved linear density resolution since the keeper provides additional shielding that will allow only the flux from transitions directly beneath the saturated region to fringe into the MR sensor. The keeper in effect acts as an extension of the head pole shields for the MR sensor and thus forms a virtual shield that is in direct contact with the media, thereby improving the linear density resolution with respect to that of a conventional MR element without a keeper. In addition to these advantages, the keeper acts as a shield with respect to flux from adjacent tracks, and therefore reduces the side reading effects of the system, thereby affording the opportunity for greater track density in the design of the system.

Referring now to FIG. 4, which is an enlarged view of a portion of the gap structure illustrated in FIG. 3, the magnetic flux paths influencing the gap are illustrated in more detail. R1 represents the reluctance between the MR sensor and the saturated region of the keeper. R2 is the reluctance between the head pole and the unsaturated region of the keeper. When the region of the keeper beneath the head gap saturates, the permeability of that region drops to a much lower value, approximately that of air. However, the region outside the saturated region is still of high permeability, and therefore retains a low reluctance compared to that of R1.

In the saturated state, most of the bias flux now flows in the path between the head poles and the unsaturated regions of the keeper. Very little flux will flow between the MR sensor element and the saturated region of the keeper. Because of the relatively low flux level between the MR sensor element and the saturated region of the keeper, any tendency for the MR sensor to be saturated by the bias flux is substantially reduced. Consequently, an MR sensor of conventional dimension will function efficiently in this embodiment, especially with the additional shielding effect available from the keeper. Furthermore, since the head gap leakage direction is at right angles to the direction of the flux from the recorded bits in the media, there is little or no resulting interference with the operation of the MR sensor.

It should be noted that the improvements mentioned with respect to this embodiment occur without the spacing loss reduction that is available with respect to the embodiment of FIG. 1. However, since the thickness of the keeper layer required for an MR media is quite thin, the combination of keepered media and an MR detector is a very sensitive readback device which increases resolution and reduces non-linear transition shift with minimal added spacing loss.

Figure 5:
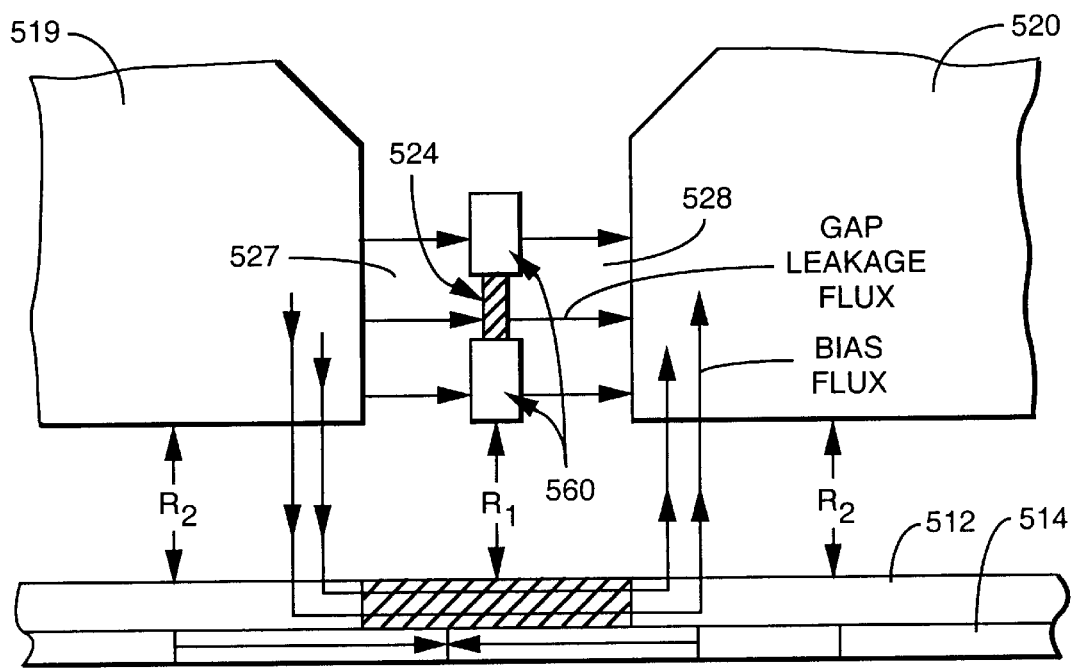
FIG. 5 is a schematic view of yet another alternative embodiment of the invention.

Referring now to FIG. 5, yet another embodiment of the system of the invention is illustrated. FIG. 5 represents an enlarged view of an alternative embodiment of an MR sensor that is again adapted to be placed in the head gap of a keepered media system such as that illustrated in FIG. 4. Consequently, similar numerals are again used to designate similar items of the figure, with the exception that corresponding series 500 numerals are used.

In FIG. 5, a somewhat different MR sensor is employed, but it is still mounted in the same relative position within the gap between nonmagnetic layers 527, 528. The sensor is bounded on either end by flux guides 560, with the lower flux guide being located at the same relative level as the bottom of the head. Consequently, the flux from the storage layer is channeled to the MR sensor by the lower flux guide, with the upper flux guide serving to balance the upper magnetic circuit. This embodiment offers somewhat more protection from surface defect damage than does the embodiment of FIG. 3, with only a small loss of sensitivity. Also, since the MR sensor is attached to the flux guides, the full range of fabrication techniques and sensor dimensions are retained.

In the preferred embodiments the head gap has a width in the range of 2 to 15 microinches and a total height in the range of 100 to 600 microinches. The MR element and the SAL are designed to each have a thickness in the range of 50 to 400 Angstroms, with the MR element used in FIG. 4 having a thickness near 400 Angstroms if desired. The isolation spacer between the MR element and the SAL should have a dimension in the range of 5 to 30 Angstroms and the outside isolation layers can be between 0.8 and 7 microinches wide.

The MR element and the SAL can be dimensioned within the range of 40 to 240 microinches in height and the flux guide associated with the MR sensor in the embodiment of FIG. 5 can have a height of about 80 microinches. The head is designed to accomodate a recording track width of 40 to 250 microinches, although it should be recognized that all these dimensions could vary as the technology described herein is further developed.

It should be apparent that the embodiments described herein are arranged for carrying out both read and write functions through the same head structure. However, it should also be recognized that the sensing arrangement described herein could be used solely for the purpose of sensing or read operations, if desired, and provided that separate write components were provided in the system.

We claim:

1. A system for recording and playing back a data signal, the system including a medium having a magnetic storage layer and a magnetically saturable keeper layer, comprising:

an inductive head core having a core flux path, and at least a front gap located at a flying surface of the inductive head core;

a magnetoresistive (MR) detector disposed within the core flux path for intercepting and transducing magnetic flux representative of the data signal to provide the playback data signal;

bias means integral with the inductive head core for imaging the front gap in the keeper layer to ensure that the keeper layer is saturated so as to enable playback of the stored data signal via the MR detector; and switch means for enabling the bias means during the playback of the stored data signal via the MR detector, and for disabling the bias means when the data signal is being recorded in the storage layer via the front gap.

2. The system of claim 1 wherein the MR detector is inserted as part of the inductive head core and is located at the flying surface of the head core, and wherein the bias means is located away from the flying surface of the head core.

3. The system of claim 1 wherein the MR detector is inserted as part of the head core and is located away from the flying surface of the head core, and wherein the bias means is located near the flying surface of the head core.

4. The system of claim 1 wherein the MR detector is comprised of a magnetoresistive sensing element and a soft adjacent layer separated by a nonconductive layer, wherein the MR detector and soft adjacent layer are contained between a pair of non-conductive isolation layers.

5. The system of claim 4 wherein the detector and the soft adjacent layer each have a thickness in the range of 50 to 400 Angstroms.

6. The system of claim 1 wherein the bias means saturates a predetermined portion of the keeper layer under the front gap of the head core.

7. The system of claim 1 further including a coil associated with the head core for applying write signals to the head core when recording and bias signals to the head core when playing back, the data signals.

8. The system of claim 1 wherein the magnetic storage layer is comprised of a high coercivity, hard magnetic material such as a cobalt based alloy and the keeper layer is comprised of a low coercivity, soft magnetic material such as a Sendust type alloy.

9. In a method of recording and playing back a data signal using an inductive magnetic transducer having a core flux path and a front gap, and a magnetic medium having a magnetic storage layer and a magnetically saturable keeper layer, the improvement comprising:

provInding a magnetoresistive (MR) detector in the core flux path to intercept and transduce magnetic flux representative of the data signal and to provide the playback data signal;

applying a bias flux to the inductive magnetic transducer during playback to image the front gap in the keeper layer to saturate the keeper layer so as to enable playback of the data signal via the MR detector; and disabling the bias flux to the inductive magnetic transducer during recording of the data signal via the front gap.

* * * * *